(No Model.)  2 Sheets—Sheet 1.
E. C. WASHBURN.
CAR COUPLING.
No. 556,036.  Patented Mar. 10, 1896.
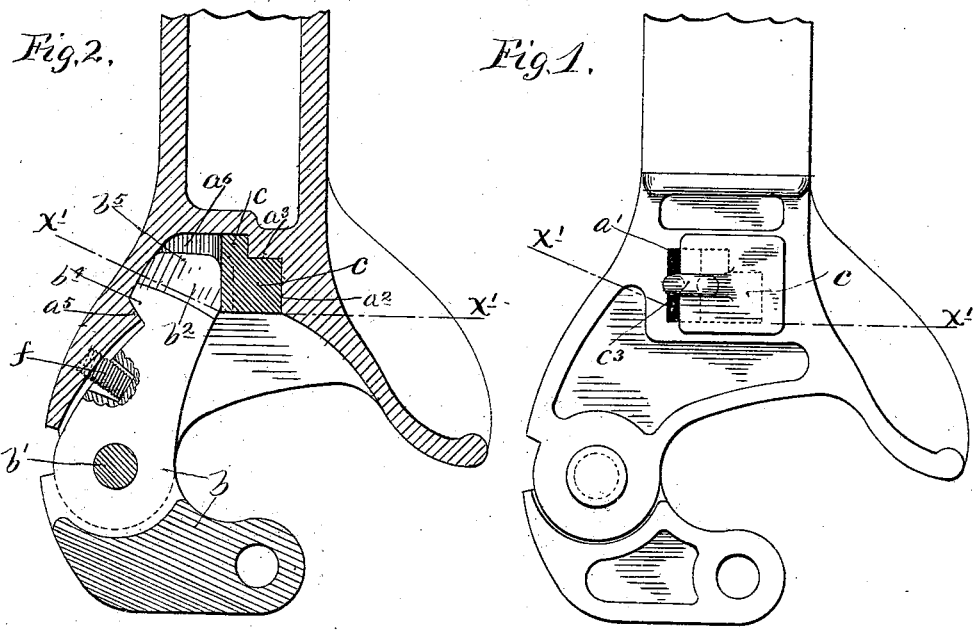
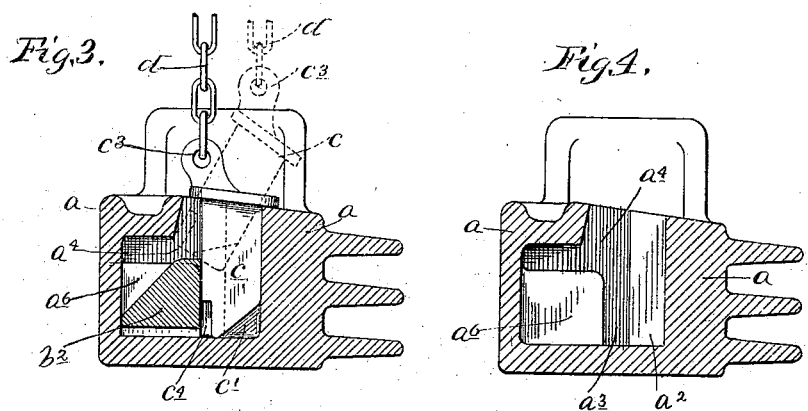
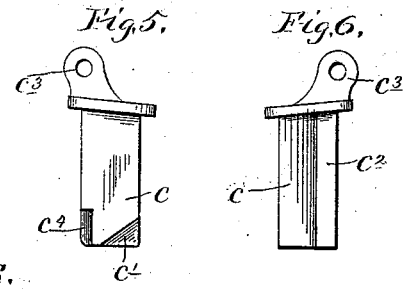
Witnesses.
C. F. Kilgore
F. D. Merchant
Inventor,
Edwin C. Washburn
By his Attorney.
Jas. F. Williamson (No Model.) 2 Sheets—Sheet 2.
E. C. WASHBURN.
CAR COUPLING.
No. 556,036. Patented Mar. 10, 1896.
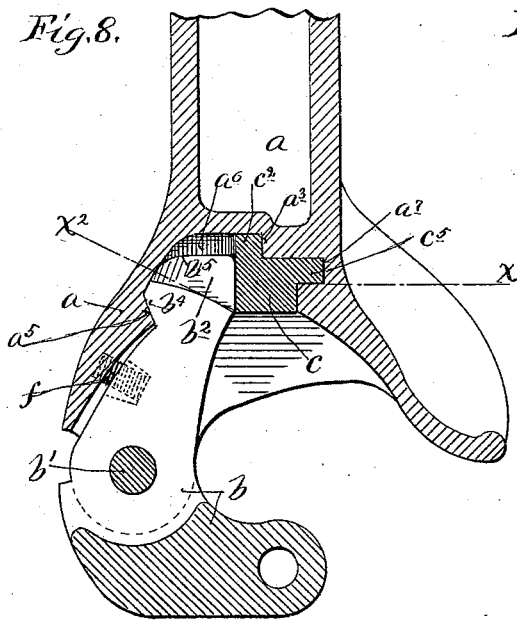
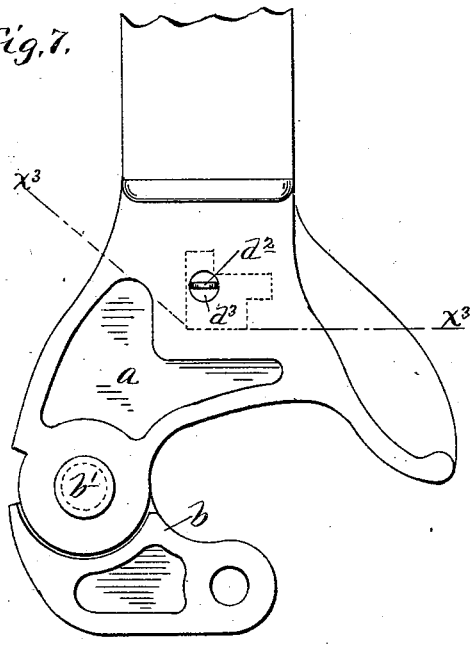
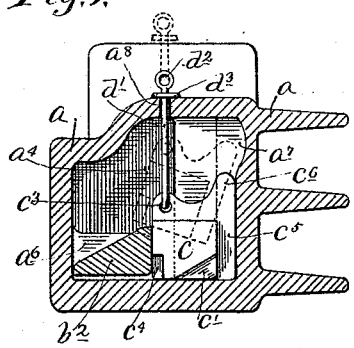
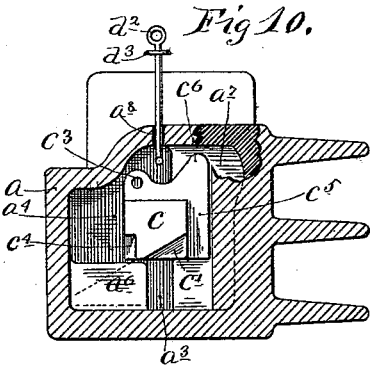
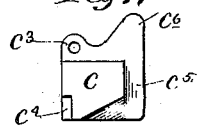
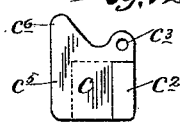
Witnesses.
C. F. Kilgore
R. D. Merchant
Inventor.
Edwin C. Washburn
By his Attorney,
Jas. P. Williamson

UNITED STATES PATENT OFFICE.

EDWIN C. WASHBURN, OF MINNEAPOLIS, MINNESOTA.

CAR-COUPLING.

SPECIFICATION forming part of Letters Patent No. 556,036, dated March 10, 1896.

Application filed October 24, 1895. Serial No. 566,701. (No model.)

*To all whom it may concern:*

Be it known that I, EDWIN C. WASHBURN, a citizen of the United States, residing at Minneapolis, in the county of Hennepin and State of Minnesota, have invented certain new and useful Improvements in Car-Couplers; and I do hereby declare the following to be a full, clear, and exact description of the invention, such as will enable others skilled in the art to which it appertains to make and use the same.

My invention relates to car-couplers of the type known as "automatic twin couplers," and has for its object to simplify the construction, thereby decreasing the first cost of the same, and at the same time to render the coupler more durable and efficient in operation.

To these ends my invention comprises the novel devices and combinations of devices hereinafter described and defined in the claims.

Several forms of my invention are illustrated in the accompanying drawings. Therein like letters refer to like parts throughout the several views.

Figure 1 is a plan view of the coupler. Fig. 2 is a horizontal section of the same. Fig. 3 is a vertical section taken on the line $x'$ $x'$ of Figs. 1 and 2, looking toward the rear. Fig. 4 is a vertical section taken on the line $x'$ $x'$ of Figs. 1 and 2, the coupling-hook and the locking-dog of the coupler being removed. Figs. 5 and 6 are detail views of the locking-dog, respectively in front and rear elevation. Fig. 7 is a plan view of a modified form of my coupler. Fig. 8 is a horizontal section of the coupler shown in Fig. 7. Fig. 9 is a vertical section taken on the line $x^2$ $x^2$ of Fig. 8, looking toward the rear. Fig. 10 is a vertical section taken on line $x^2$ $x^2$ of Fig. 7, looking toward the rear, the locking-dog being shown as partially removed from its seat in the coupler-head; and Figs. 11 and 12 are detail views of the locking-dog employed in this construction, respectively in front and rear elevation.

$a$ indicates the recessed coupler-head, having a locking-dog passage $a'$ in its upper wall, provided on its interior with a locking-dog seat $a^2$ $a^3$ $a^4$ and with bearing-surfaces $a^5$ $a^6$.

$b$ indicates the coupling-hook, pivoted to the coupler-head by means of the pivot-pin $b'$ and provided with a beveled or cam-action tailpiece $b^2$ and with bearing-surfaces $b^3$ $b^4$, engageable respectively with the bearing-surfaces $a^5$ $a^6$ on the coupler-head.

$c$ is the locking-dog, provided with a beveled or cam-action bottom $c'$, co-operating under the closing movement of the coupling-hook with the beveled tailpiece $b^2$ of said coupling-hook and having a rearwardly-projecting guide-flange $c^2$ co-operating with the seat portions $a^3$ $a^4$ of the coupler-head, and provided also at its upper end, exterior of the coupler-head, with an eye-lug $c^3$. It is important to note that this eye-lug $c^3$ is located at a point offset from or to one side of the line of the center of gravity of the locking-dog, so that when raised by the lifting connection $d$ the dog will tend to swing from a true vertical position into the dotted-line position shown by Fig. 3 for a purpose which will be more particularly pointed out later on. It should also be noted that the lock-pin passage $a'$ and the seat portion $a^4$ of the coupler-head are sufficiently extended toward the left to permit the lateral movement of the locking-dog into the position shown by dotted lines in Fig. 3, and that said seat portion $a^3$ merges into the seat portion $a^4$ at a point slightly below the upper surface of the cam end $b^2$ of the coupling-hook $b$.

If desired, the locking-dog $c$ may be provided with a notch $c^4$ at its lower end, which will permit the locking-dog a partial drop when the coupling-hook is thrown nearly, but not quite, to its extreme inward position, thereby making it possible to couple cars while standing on a curve. In this case, as is evident, as soon as the cars are drawn onto a straight section of track the coupling-hook will be completely closed, thereby permitting the locking-dog to drop to its limit and complete the locking action.

If desired, the coupler may be made still further automatic, in that the coupling-hook when released will be automatically thrown into its opened position. As shown, this is accomplished by a coiled spring $f$, fitting in suitable seats in the coupler-head and the coupling-hook and compressed between said head and hook.

The operation of this car-coupler may be briefly summarized as follows: It is assumed that the several cars are coupled together and that the parts of the coupler are in the position shown in Figs. 1, 2 and 3 of the drawings, and that it is desired to set the coupler in advance, so that the cars may be subsequently drawn apart without further attention to the coupler. It is then only necessary to lift the locking-dog $c$, by means of the lifting connection $d$, so that the flange $c^2$ of said locking-dog will be raised out of the seat portion $a^3$ into the seat portion $a^4$, clear above the tailpiece $b^2$ of the coupling-hook $b$. When thus raised, in virtue of the fact that the locking-dog is suspended from a point offset from or to one side of its center line of gravity, it will tend to swing into the position shown by dotted lines in Fig. 3, as already pointed out. When the locking-dog is allowed to lower by slacking the lifting connection $d$, it will lodge and rest on the upper face of the tailpiece $b^2$ of the coupling-hook. As is evident, the coupling-hook $b$ will then be free to be swung outward or into an open position as the cars are drawn apart. Under this opening movement of the coupling-hook the lower end of the locking-dog will first be carried to the right until the dog assumes a vertical position with the flange $c^2$ again in line with the seat portion $a^3$, and then as the cam portion $b^2$ is further moved outward from under the dog said dog will again drop into its lowermost position, as shown by full lines in Fig. 3. The coupling-hook is now assumed to be in its open position, and may be closed and locked automatically under the coupling action of the cars or by otherwise forcing the coupling-hook into its closed position, under which action the cam portion $b^2$ of the coupler-hook, co-operating with the cam portion $c'$ of the locking-dog, causes said locking-dog to raise and permit the passage of the tail end of the hook. After the tail of the coupling-hook reaches its extreme innermost position the locking-dog will, of course, again fall into its locked position, and the parts will be locked together, as shown by full lines in Fig. 3.

It will be noted that the engagement of the guide-flange $c^2$ with the seat portion $a^3$ securely holds the locking-dog from lateral movement during its initial upper movement and until it has substantially reached the highest point to which it is thrown by the cam action of the coupling-hook. The cam-surfaces $b^2$ and $c'$ are so related to each other, and to the locking-dog seat in the coupler-head, that, even without this flange $c^2$, the coupling-hook would be raised on a true vertical line; but the said flange $c^2$ gives additional security against any lateral movement until the proper time.

Attention is here called to the action of the bearing-surfaces $a^5$ and $a^6$ of the coupler-head $a$ and $b^3$ $b^4$ of the coupling-hook. By reference to Fig. 4 it will be seen that when the coupling-hook is locked in its closed position the tail end of the coupling-hook is held with a dovetailed action between the seat portions $a^5$ $a^6$ and the engaging-face of the locking-dog $c$. In virtue of this action, under the bumping strain on the coupling-hook, the bearing-surface $b^4$ of the hook will be resisted by the bearing-surface $a^6$ on the coupler-head $a$, while under the drawing action the bearing-surface $b^3$ of the coupling-hook will engage the shoulder or bearing-surface $a^5$ of the coupler-head, under both of which actions the pivot-pin $b'$ of the hook $b$ is relieved from excessive endwise strains under the pulling or bumping action.

In the construction shown in Figs. 8 to 12, inclusive, the parts therein shown are substantially like those just described, with the following exceptions: The locking-dog $c$ is made shorter than the one above described, works entirely from the interior of the coupling-head, and is provided, in addition to the parts above enumerated, with a laterally-projecting flange or guide-rib $c^5$, which works in a vertical seat portion $a^7$ in the coupler-head $a$ and terminates at its upper end in a projecting point $c^6$. The eye-lug $c^3$ is connected, within the recess of the coupler-head, to the depending hook-like end of a vertical lifting-rod or connection $d'$, working vertically through a passage $a^8$ in the upper wall of the coupler-head, and terminating at its upper and outer end in an eye $d^2$. If desired, this lifting-rod $d'$ may be provided with a flange or ring $b^3$, which, when the rod and lock-pin are in their lowermost position, as shown in Fig. 9, tightly closes the passage $a^8$, thereby preventing rain, dirt or snow from working through said passage $a^8$ into the interior of the coupler-head. The operation of this latter construction is also substantially identical with that of the construction above set forth in connection with Figs. 1 to 6, inclusive. When the locking-dog is raised above the cam end $b^2$ of the coupling-hook, the locking-dog will turn on the eye $c^3$ as a pivot and will swing by gravity into the position shown by dotted lines in Fig. 9, with its bottom portion lodging or resting on said cam end $b^2$. The projecting point $c^6$ of the locking-dog is simply provided as an auxiliary means for insuring the initial swinging movement of the locking-dog, which it does by engagement with the upper wall of the coupler-head when the locking-dog is raised to its extreme upper position. Attention is called, in connection with this construction, to the fact that it is not necessary to provide a passage, either in the upper or the lower walls of the coupler-head, for the introduction of the locking-dog. This locking-dog may, when the coupling-hook is removed, be inserted from the front of the recessed coupler-head, as shown in Fig. 10 of the drawings. With this construction it is, of course, necessary to attach the lifting-rod $b'$ to the eye-lug $c^3$ after the locking-dog has been placed within the coupler-head.

It will be understood, of course, that the lifting devices for the locking-dogs, which are here shown, might take various forms, and would, of course, usually be connected to other hand-operated devices. (Not shown.) It will also be understood that, while I have shown the connection between the locking-dog and the lifting device as located at a point offset from or to one side of the center of gravity of the dog, this connection might be made at the line of the center of gravity of the dog and the lifting device itself be suspended from an offset point, so as to cause the locking-dog, when raised, to swing laterally, as set forth. The statement that the locking-dog is suspended from a point offset from and to one side of its center of gravity is intended to be broad enough to cover both of the above constructions.

Various other alterations might, of course, be made without departing from the spirit of my invention.

It must be evident from the above that my invention gives a coupler which is extremely simple in construction, efficient in operation, and correspondingly cheap to make.

What I claim, and desire to secure by Letters Patent of the United States, is as follows:

1. The combination involving a coupler-head, coupling-hook and locking-dog, with the seat for the dog, in said head, constructed to prevent lateral movement of the dog, in the vertical movement of the same, up to a point substantially at the level of the tailpiece of the hook and then to permit lateral movement of the dog over said tailpiece for lodgment thereon, and a lifting connection arranged to suspend said dog from a point offset from the line of the center of gravity of the dog, in the pulling strain, substantially as described.

2. The combination involving a coupler-head, coupling-hook and locking-dog, said coupling-hook and locking-dog having co-operating cam-surfaces, whereby said dog will be raised by the closing movement of said hook, and with the seat for said dog, in said head, constructed to prevent lateral movement of said dog, in the vertical movement of the same, up to a point substantially at the level of the tailpiece of said hook and then to permit lateral movement of said dog over said tailpiece for lodgment thereon, and a lifting connection arranged to suspend said dog from a point offset from the line of its center of gravity, in a direction to cause said dog, when raised, to swing over said tailpiece, substantially as described.

3. The combination involving a recessed coupler-head, a coupling-hook, a vertically-movable locking-dog working entirely within the recess of said coupler-head, between the upper and lower walls thereof, and a lifting rod or connection working vertically through the upper wall of said coupler-head and pivotally attached to said locking-dog at a point within the recess of said coupler-head and at a point offset from the line of its center of gravity, substantially as described.

4. The combination with the recessed coupler-head provided with the locking-dog seat $a^3 a^4 a^7$, of the vertically-movable locking-dog $c$ with flange $c^5$ and pivot-eye $c^3$, and the vertically-movable lifting-rod $d'$ working through the upper wall of said coupler-head and attached at its lower end to the pivot-eye $c^3$ of said locking-dog, substantially as described.

5. The combination with the recessed coupler-head provided with the locking-dog seat $a^3 a^4$ and $a^7$, of the vertically-movable locking-dog $c$ with flange $c^5$, pivot-eye $c^3$ and the projecting point $c^6$ engageable with the upper wall of the coupler-head, and the vertically-movable lifting-rod $d'$ working through said upper wall and attached, at its lower end, to the pivot-eye $c^3$ of said locking-dog, substantially as described.

6. The combination with the recessed coupler-head, coupling-hook and locking-dog, said coupling-hook and said locking-dog having co-operating cam-surfaces, whereby said dog will be raised under the closing movement of said hook, and the seat for said dog, in said coupler-head, being constructed to prevent lateral movement of the dog, in the vertical movement of the same, up to a point substantially at the level of the tailpiece of the hook, and then to permit lateral movement of the dog, over said tailpiece, for lodgment thereon, and a lifting connection arranged to suspend said dog from a point offset from its center of gravity, substantially as described.

In testimony whereof I affix my signature in presence of two witnesses.

EDWIN C. WASHBURN.

Witnesses:
E. F. ELMORE,
JAS. F. WILLIAMSON.